US011910852B2

(12) United States Patent
Bergman et al.

(10) Patent No.: US 11,910,852 B2
(45) Date of Patent: Feb. 27, 2024

(54) FACEMASK WITH AUTOMATED VOICE DISPLAY

(71) Applicant: Sorenson IP Holdings, LLC, Salt Lake City, UT (US)

(72) Inventors: Doug Bergman, West Jordan, UT (US); Glenn Andrew Mohan, Clermont, FL (US); David Thomson, Bountiful, UT (US); Kerry Brown, Draper, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 456 days.

(21) Appl. No.: 17/190,876

(22) Filed: Mar. 3, 2021

(65) Prior Publication Data

US 2022/0279874 A1 Sep. 8, 2022

(51) Int. Cl.
*A41D 13/11* (2006.01)
*G06F 3/16* (2006.01)
*G09F 9/33* (2006.01)
*G10L 15/26* (2006.01)
*G09B 21/00* (2006.01)

(52) U.S. Cl.
CPC .............. *A41D 13/11* (2013.01); *G06F 3/167* (2013.01); *G09F 9/33* (2013.01); *G10L 15/26* (2013.01); *G09B 21/009* (2013.01)

(58) Field of Classification Search
CPC ...................................................... A41D 13/11

USPC .................................................................. 2/9
See application file for complete search history.

(56) References Cited

U.S. PATENT DOCUMENTS

| 9,191,789 | B2 | 11/2015 | Pan | |
|---|---|---|---|---|
| 9,374,536 | B1 | 6/2016 | Nola et al. | |
| 9,497,315 | B1 | 11/2016 | Pakidko | |
| 9,503,569 | B1 | 11/2016 | Adams | |
| 9,525,830 | B1 | 12/2016 | Roylance et al. | |
| 2014/0180686 | A1* | 6/2014 | Schuck | G10L 15/26 704/235 |
| 2018/0368505 | A1* | 12/2018 | Kidman | A42B 3/044 |
| 2019/0098417 | A1* | 3/2019 | Littrell | H04R 3/04 |
| 2019/0178476 | A1* | 6/2019 | Ross | F21V 33/0056 |

* cited by examiner

*Primary Examiner* — Timothy K Trieu
(74) *Attorney, Agent, or Firm* — Ballard Spahr LLP

(57) ABSTRACT

A facemask system with automated voice display is disclosed. The facemask includes a covering configured to be positioned about the face of a user. At least one microphone is positioned adjacent the covering and the facemask includes a display for displaying language spoken captured by at least one microphone. A processor is in operable communication with the microphone and the display. The facemask includes a memory that contains instructions that can be executed by the processor to perform operations. The operations include receiving signals from at least one microphone, identifying language contained within the signals, and displaying the language on the display.

22 Claims, 6 Drawing Sheets

FACEMASK WITH AUTOMATED VOICE DISPLAY

TECHNICAL FIELD

The application relates generally to the capture and conversion of a user's voice into language for display by the user, and more specifically, to systems, apparatuses, and methods for capturing voice from a mask worn by a user, converting the voice to language, and displaying the language to others to facilitate communication.

BACKGROUND

Real time transcriptions and display of voice communications may assist people trying to communicate in noisy environments, in environments where the voice of the speaker may be muted or muffled, or where one of the communicators is hard-of-hearing or deaf. There are devices such as close caption phones that assist people that are hard-of-hearing or deaf to participate in the audio communications. Some of these devices may translate audio communications into text by using human interpreters or hear the voice and type the corresponding text. In other devices, automatic speech recognition ("ASR") systems may be used. The text is then provided to a display for the hard-of-hearing or deaf person to read.

These close caption systems, however, are made for controlled environments, such as the inside of house. The translated voice of a user is typically displayed at the other end of communication line such as a telephone line, as part of another person's phone. The text display is typically not meant for the speaker's phone, but rather the receiver's or reader's phone or display. Prior art close caption systems are typically not meant for face-to-face use and typically require a communication channel where both parties have communication devices.

A visual representation of a spoken words may be beneficial for face-to-face communicators where only one communicator requires a device. The ability of a speaker to display what they are saying at the place where they are saying it may be useful in environments or circumstances where ambient noise makes it difficult to hear the speaker, or where the speaker's voice is muffled or damped by a mask. Such a device that could translated voice into a visual representation would also benefit speakers who need to communicate with someone who is deaf or hard of hearing. Accordingly, it would be advancement to have a user be able to display what they are speaking in visual form to those that may be with them. Embodiments of such an improvement are disclosed and claimed herein.

The claimed subject matter is not limited to embodiments that solve particular disadvantages or that operate only in environments such as those described above. Rather, this background is only provided to illustrate one example technology area where some embodiments described herein may be practiced.

SUMMARY

Embodiments of a facemask system described herein may include a covering configured to be positioned about the face of a user. The system may include one or more microphones positioned near the mouth of a user. In one embodiment, a proximal microphone is positioned closer to a user's mouth than a distal microphone. The microphones may be attached to the covering and may be used to increase the signal to noise ratio of the proximal microphone. In certain embodiments the microphones may be cardioid microphones.

The facemask system may include a display. In one embodiment, the display is attached to the covering and may be configured to face outwardly to display text or video corresponding to words spoken by the user to another person. In another embodiment, the display is integral with the covering. The facemask system may include a processor that is operable communication with at least one microphone and the display.

The facemask system includes a memory containing instructions that can be executed by the processor to perform operations. In one embodiment, the operations include receiving audio through one or more of the microphones and outputting audio signals. The operations include identifying words contained within the audio signals received from one or more microphones using automated speech recognition software. In another embodiment, the operations include receiving audio from at least two microphones and using noise reduction techniques to reduce undesired noise within the audio signals. Those techniques may include triangulation, beamforming, or other techniques to cancel undesired noise and/or increase the signal to noise ratio of an audio signal associated with a user's voice. Automated speech recognition techniques may be used to identify words or speech within the audio signal. The operations may also include displaying the identified words on the display as one or more of text and video signals. In one embodiment, the facemask system displays sign language corresponding to the user's spoken words as a video signal to the display. In another embodiment, the facemask system may display lip motion corresponding to the user's spoken words as a video signal to the display.

A method of displaying text and/or video corresponding to words identified from an audio signal of a user's voice using the facemask system may also be disclosed.

DETAILED DESCRIPTION

Figure 1:
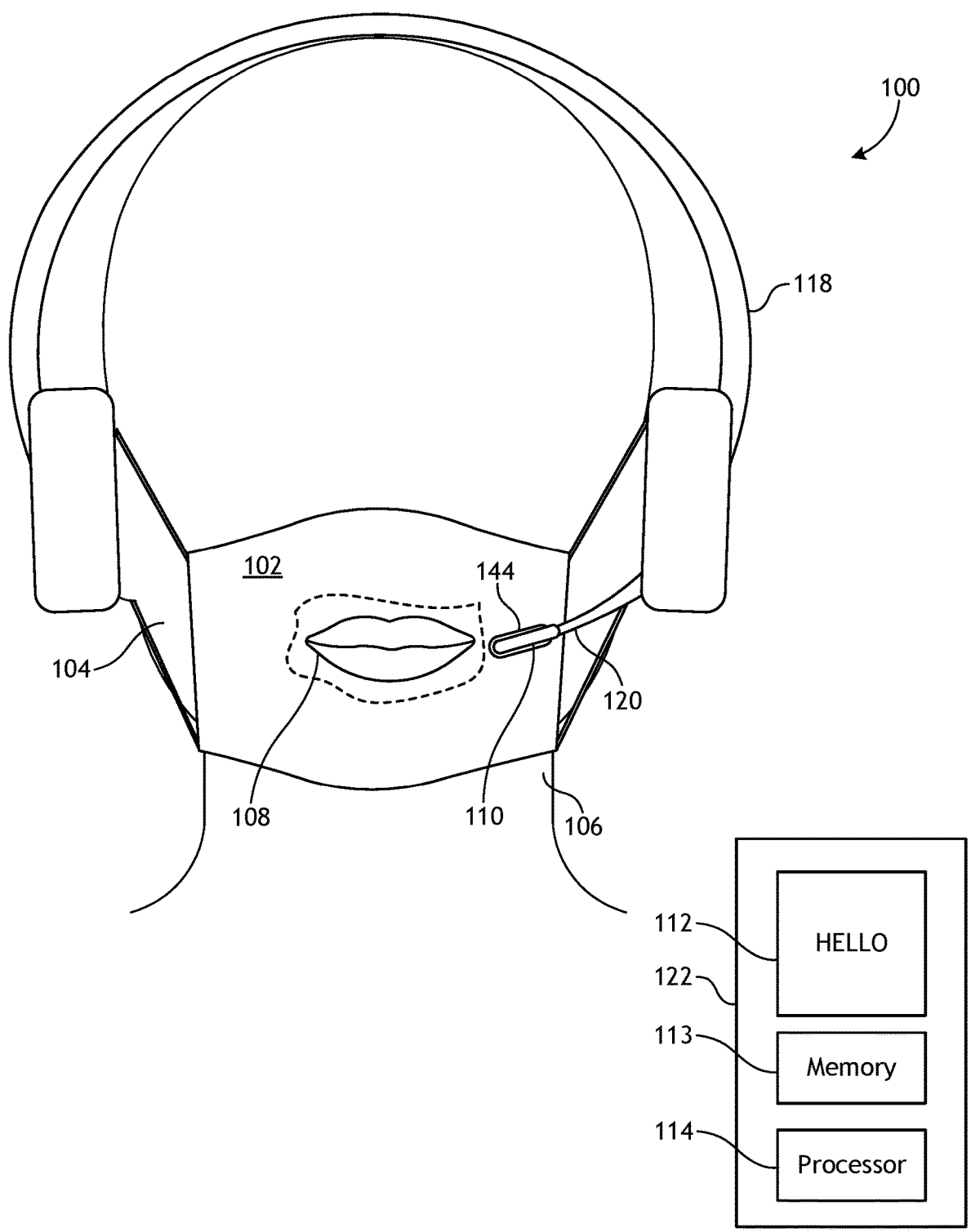
FIG. 1 is a front plan view of a characterization of a user using an embodiment of a facemask system disclosed herein.

In the following detailed description, reference is made to the accompanying drawings which form a part hereof, and in which are illustrated specific embodiments of the present invention. These embodiments are described in sufficient detail to enable those of ordinary skill in the art to practice the disclosure. It should be understood, however, that the detailed description, while indicating examples of embodiments of the disclosure, are given by way of illustration only and not by way of limitation. Accordingly, various substitutions, modifications, additions rearrangements, or combinations thereof are within the scope of this disclosure.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, various aspects or features will be presented in terms of systems or devices that may include a number of devices, components, modules, and the like. It is to be understood and appreciated that the various systems and/or devices may include additional devices, components, modules, etc. and/or may not include all of the devices, components, modules etc. discussed in connection with the figures. Furthermore, all or a portion of any embodiment disclosed herein may be utilized with all or a portion of any other embodiment, unless stated otherwise. Accordingly, the present invention is not limited to relative sizes or intervals illustrated in the accompanying drawings.

In addition, it is noted that the embodiments may be described in terms of a process that is depicted as method steps, a flowchart, a flow diagram, a schematic diagram, a block diagram, a function, a procedure, a subroutine, a subprogram, and the like. Although the process may describe operational steps in a particular sequence, it is to be understood that some or all of such steps may be performed in a different sequence. In certain circumstances, the steps be performed concurrently with other steps.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in this disclosure should not be interpreted as excluding the embodiments of the disclosure. Additional term usage is described below to assist the reader in understanding the disclosure.

The terms "have," "may have," "include," and "may include" as used herein indicate the presence of corresponding features (for example, elements such as numerical values, functions, operations, or parts), and do not preclude the presence of additional features.

The word "exemplary" is used herein to mean "serving as an example or illustration." Any aspect or design described herein as "exemplary" is not necessarily to be construed as preferred or advantageous over other aspects or designs.

The terms "A or B," "at least one of A and B," "one or more of A and B", or "A and/or B" as used herein include all possible combinations of items enumerated with them. For example, use of these terms, with A and B representing different items, means: (1) including at least one A; (2) including at least one B; or (3) including both at least one A and at least one B. In addition, the articles "a" and "an" as used herein should generally be construed to mean "one or more" unless specified otherwise or clear from the context to be directed to a singular form.

Terms such as "first," "second," and so forth are used herein to distinguish one component from another without limiting the components and do not necessarily reflect importance, quantity, or an order of use. For example, a first user device and a second user device may indicate different user devices regardless of the order or importance. Furthermore, a reference to first and second elements does not mean that only two elements may be employed there or that the first element must precede the second element in some manner. Also, unless stated otherwise a set of elements may comprise one or more elements.

It will be understood that, when two or more elements are described as being "coupled", "operatively coupled", "in communication", or "in operable communication" with or to each other, the connection or communication may be direct, or there may be an intervening element between the two or more elements. To the contrary, it will be understood that when two or more elements are described as being "directly" coupled with or to another element or in "direct communication" with or to another element, there is no intervening element between the first two or more elements.

Furthermore, "connections" or "communication" between elements may be, without limitation, wired, wireless, electrical, mechanical, optical, chemical, electrochemical, comparative, by sensing, or in any other way two or more elements interact, communicate, or acknowledge each other. It will further be appreciated that elements may be "connected" with or to each other, or in "communication" with or to each other by way of local or remote processes, local or remote devices or systems, distributed devices, or systems, or across local or area networks, telecommunication networks, the Internet, other data communication networks conforming to a variety of protocols, or combinations of any of these. Thus, by way of non-limiting example, units, components, modules, elements, devices, and the like may be "connected", or "communicate" with each other locally or remotely by means of a coaxial cable, fiber optic cable, twisted pair, digital subscriber line (DSL), shared chipset or wireless technologies such as infrared, radio, and microwave.

The expression "configured to" as used herein may be used interchangeably with "suitable for," "having the capacity to," "designed to," "adapted to," "made to," or "capable of" according to a context. The term "configured" does not necessarily mean "specifically designed to" in a hardware level. Instead, the expression "apparatus configured to . . . " may mean that the apparatus is "capable of . . . " along with other devices or parts in a certain context.

Information and signals described herein may be represented using any of a variety of different technologies and techniques. For example, data, instructions, commands, information, messages, signals, bits, symbols, and chips that may be referenced throughout the description may be represented by voltages, currents, electromagnetic waves, magnetic fields or particles, optical fields or particles, lasers, or any combination thereof. Some drawings may illustrate signals as a single signal for clarity of presentation and description. It should be understood by a person of ordinary skill in the art that the signal may represent a bus of signals, wherein the bus may have a variety of bit widths and the embodiments disclosed herein may be implemented on any number of data signals including a single data signal.

Various aspects of the embodiments described herein are referred to as having, or as being implemented by a "device", "component", or "module". The labels given these items should not be used to limit the scope of the embodiments. Indeed, the term "implementing structure" is meant to include any structure used to implement the various functions, features, aspects, algorithms, methods, or processes of the embodiments described herein and may be configured in a variety of ways without departing from the scope of the present invention.

"Implementing structures" include hardware, software, firmware, or a combination of these. "Implementing structures" include, without limitation, a field programmable gate array (FPGA), an application specific integrated circuit (ASIC), or a programmable-logic device. An "implementing structure" may be configured to be in an addressable storage medium or to execute one or more processors. "Implementing structures" may include, without limitation, elements such as software elements, object-oriented software elements, class elements, and task elements, processes, functions, attributes, procedures, sub-routines, segments of program codes, drivers, firmware, micro-codes, circuits, data, database, data structures, tables, arrays, logic blocks and variables.

"Instructions" may be any type of computer program, executable, command or implementing structure capable of carrying out the operations, functions, or processes of the embodiments described herein.

A "processor," as may be referenced herein throughout, may be any processor, controller, microcontroller, state machine or combination of the foregoing suitable for carrying out the processes of the disclosure. A processor may also be implemented as a combination of computing devices, such as a combination of a DSP and a microprocessor, a plurality of microprocessors, one or more microprocessors in conjunction with a DSP core, or any other such configuration. Reference to a "processor" should not be limited to residing to any one particular device but includes all processors or a subset of all processors whether they reside on a single or multiple devices.

References to "memory" are intended to comprise, without being limited to, any structure that can store, transmit, and/or receive data or information related to the embodiments described herein, or components, modules or units of the embodiments described herein. "Memory," as referenced herein, can be either volatile memory or nonvolatile memory, or can include both volatile and nonvolatile memory. "Memory" includes computer-readable media and medium.

Like reference numerals may be used to denote like features throughout the specification and figures.

Referring now to FIG. 1, a facemask system 100 includes a covering 102 configured to be positioned about the face 104 of a user 106. In one embodiment, the covering 102 is configured to be positioned about a nose (not shown) and/or mouth 108 of the user 106 help avoid particulates or biologicals from entering or exiting the mouth 108 (shown in cutaway). It will be appreciated that particulates can include any number of things such as dirt, dust, paint, or matter of any kind. Additionally, biologicals may include viruses, bacteria, carriers of disease or illness, mucous, blood, and the like. At least one microphone 110 may be positioned adjacent the covering 102 and is configured to capture sounds made by the mouth 108 of the user 106. The facemask system 100 may include a display 112 in operable communication with the microphone 110. A processor 114 is in operable communication with the at least one microphone 110 and the display 112. The processor 114 is configured to execute instructions stored in a memory (not shown) to perform facemask system 100 operations. The operations may include receiving audio through the at least one microphone 110, outputting an audio signal corresponding to the received audio, identifying words or speech contained within the audio signal, and displaying the words or speech on the display 112.

In one embodiment, the covering 102 may be made of woven or nonwoven fabric and may include multiple plies of the same or different material. The covering 102 may be chosen and configured in any number of ways to accomplish its intended use. For example, where the spread of germs is a concern, the covering 102 may be a latex-free, tightly woven fabric that provides a good seal along its edges. The covering 102 may include a moisture barrier (not shown). This barrier may be one or more of the plies of, or a lining attached to, the covering 102. The covering 102 may act as filter for micro or macro particles. The covering 102 may act as a pop filter or sound shield to reduce ambient noise picked up by the microphone 110

According to an embodiment, the covering 102 may be more rigid and may be configured to be position just in front of the face 104, as opposed to conforming to the face 104. In these embodiments, the covering may made of material that is clear or transparent, such as by way of non-limiting example, plastics, glass, polycarbonates, polyurethanes, acrylics, and the like. The covering may include a covering securement device 116 to secure the covering 102 in position relative to the face 104. The covering securement device 116 may include any of a number of ways known in the art to secure a covering about a face, including without limitation, bands, straps, ties, fabrics, elastics, hats, headsets, and the like. The covering securement device 116 may be attached to or integral with the covering. In certain embodiments, covering securement device 116 may be elastic or have attachment mechanisms such as Velcro, clasps, buckles, magnetic devices, or other attachment mechanisms known in the art.

It will be appreciated by those of skill in the art the covering 102 may already exist for a particular use such as a medical mask or construction mask. The mask may be configured to protect the user 106 or others from dust, moisture, chemicals, or microorganisms. It may be configured to shield internal microphones from external noise or physical damage, to shield the sound of the voice of user 106 from others hearing (as in a court reporter dictating mask), or to prevent acoustic feedback such as with a public address system. It may be configured to protect the user 106 from physical injury, to provide oxygen to the user 106, to shield the user 106 from gasses or fumes (as in a gas mask), or to keep the user 106 warm. It may be decorative as in a Halloween mask. In one embodiment, the facemask system 100 may incorporate such a preexisting covering 102, which may be fitted with some or all of the facemask system components disclosed herein throughout. In other embodiments, the covering 102 of the facemask system 100 may be custom or original to the facemask system 100.

The facemask system 100 may include a microphone 110. The microphone 110 may be any instrument for converting sound waves into electrical energy variations which may be amplified, transmitted, or recorded. The microphone is configured to detect sound and produce a corresponding audio signal. In one embodiment, the microphone 110 may be one of more of a cardioid microphone, a condenser microphone, a reference microphone, an omnidirectional microphone, a bidirectional microphone, a multi pattern microphone, and the like. The microphone 108 may also include any of a number of sound ports (not shown).

The microphone 110 may be a directional microphone system that includes an array of microphones. The array of microphones may include two or more omnidirectional microphones that are spaced apart according to a specified distance. In certain embodiments, the microphone 110 may be configured to produce a beamformed signal or a specific directional response with respect to a detected sound.

In one embodiment, the microphone 110 may also include a headset 118 with a boom 120. The boom 120 may allow the microphone 110 to be adjustably positioned near the mouth 108. The covering 102 may be attached to the headset 118 to help secure the covering 102 about the face 104. In one embodiment, the boom 120 may be configured to hold a plurality of microphones 110.

The microphone 110, may have a sensitivity that is lower than about 15 mV, or about negative 36 dBV/Pa, where "dBV" is a decibel with a reference value of one volt and "Pa" is a pascal. In one embodiment, the microphone sensitivity is higher than about 0.5 mV, or about negative 66 dBV/Pa. In yet another embodiment, the microphone may have a sensitivity of between about 1 mV, or about negative 60 dB V/Pa and about 8 mV, or about negative 42 dBV/Pa.

The facemask system 100 may include a shield 144 positioned about or adjacent to a microphone 110. The shield 144 may serve as a type of protection for the microphone 110, and consequently, the quality of the voice signal of a user 106, which in turn may adversely affect the ability of the facemask system 100 to recognize speech within the voice signal. The shield 144 may protect the microphone against undesired sound which may saturate the microphone making it difficult to analyze or determine the speech within the voice signal.

In one embodiment, the shield 144 may be a type of pop filter to protect against sudden releases of air due to voice plosives that may adversely affect the voice signal. For example, voice plosives can distort a signal because the increase in wind pressure may overwhelm a sensitive microphone 110 making it difficult to pick up the user's voice. The shield 144 may also serve to protect the integrity and functionality of the microphone by preventing user fluids or other material from hitting the microphone 110. The shield 144 may also protect the microphone from the effects of wind gusts or other undesirable effects that may be found in a particular environment. The shield 144 may be configured to protect the microphone from noise caused by physical contact with the face or with the mask, such as by providing a sound barrier or by holding the microphone apart from the face or the mask.

The shield 144 may be composed of one or more layers of a semi-porous material. In one embodiment, the shield 144 is composed of metallic mesh. In another embodiment, the shield 144 may include nylon. In yet another embodiment, the shield 144 may be a foam or a polymer. It will be appreciated by those of skill in the art that the shield 144 may be formed from any number of materials that provide some protection to the microphone 110 or voice signal picked up by the microphone 110, while allowing a sufficient amount of sound to pass through the shield 144. The shield can be deployed and positioned to help filter out undesired background noise. In some embodiments, the shield 144 is the covering 102. In this embodiment, the microphone 110 may be positioned with at least some of the covering found between some or all of the microphone and the user's mouth.

The display 112 may be attached to, or integrated with, the covering 102. In some embodiments, the display 112 may be part of a separate electronic device such as a mobile phone or tablet computer screen. The display 112 is configured to present a transcription of what a user says in text and/or video display. The display 112 could be one or more of a computer monitor, a television, touchscreen or other screen, a close caption device, a smart phone, a tablet, or any device capable of displaying text and/or video. In the embodiment of FIG. 1, the display 114 is the display of a cellular device 122. The display 112 may be integral with the device 100. Alternatively, the display 112 may be physically separate from the device 100. These displays may be attachable to, or worn by, a user.

The display 112 is in operable communication with the microphone 110 and the processor 114. The operable communication may be accomplished in any number of ways, including without limitation, by direct electrical wired connection, or through wireless communication such as Bluetooth (registered trademark) or Wi-Fi.

The processor 114, may be one or more processors (referred to separately and collectively herein throughout as "processor") and may reside on one or more devices. The processor 114 is configured to execute instructions stored in memory 113 to perform the operations of the facemask system 100. The memory 113 may be stored in any number of places. In one embodiment, some or all of the memory is stored locally. For example, memory may be part of, or attached to microphone 110, the display 112, and/or supporting structures therefor. In another embodiment, some or all of the memory 113 is located remotely. For example, memory 113 may be located on a remote server, or as part of a cloud-based structure. Certain functions or operations of the facemask system 100 may be performed using multiple processors 113 executing instructions located in memory 113 stored in multiple places. In other embodiments, functions of the facemask system 100 may be executed in whole or in part using the processor 114 of a phone, iPad, computer, television, close captioning device, remote server, and the like. In the embodiment shown in FIG. 1 certain display functions may be executed by the processor 114 located in the cellular device 122.

In one embodiment, the processor 114 is in operable communication with one or more of the microphone 110 and the display 112 through a wired connection. In other embodiments, the processor 114 may be in operable communication with one or more of the microphone 110 and the display 112 through a wireless connection, such as, by nonlimiting example, a Bluetooth connection, a Wi-Fi connection, or a cellular connection.

In one embodiment, the user 106 may operate the facemask system 100 through manual use of switches or buttons (not shown) located on the microphone 110, the display 112, and/or supporting structures therefor. In some embodiments, an on/off switch may be located on the boom 120 or headset 118. In other embodiments, the user 106 may use an interface (not shown) which may be located on the display 112 or a separate user interface screen (not shown). The user interface in one embodiment is the touchscreen of the cellular device 122. In other embodiments, a user 106 may operate the facemask system 100 using voice commands spoken into the microphone 108 or a microphone located on a connected device, such as the cellular device 122. In other embodiments, a user 106 may operate the facemask system 100 by means of an "app" located on a cellular device or computer. In other embodiments, the facemask system 100 may be activated by a voice activity detector that turns on when it detects speech uttered by user 106. The voice activity detector may be configured to trigger on speech from user 106 and not to trigger on ambient or other non-speech noise or on speech from other people.

The memory 113 may include instructions to perform operations to receive audio through at least one microphone 110, to output an audio signal corresponding to the audio, to recognize words or speech in the audio signal, and to display the words or speech on the display 112.

In one embodiment, the operations to receive audio may include receiving audio or audio signals from a single microphone or an array of microphones. Each microphone in the array of microphones may be strategically positioned to assist in noise reduction or cancellation in order to better isolate or enhance an audio signal associated with the user's voice. It will be appreciated that any number of microphones or combinations of microphones may be used to capture or receive audio representing the voice of a user.

The received audio may then be output as an audio signal. The operations to output an audio signal may include outputting a "beamformed signal" that may identify an audio signal that has been generated through performing beamforming operations with respect to two or more microphones. In one embodiment, outputting an audio signal may include outputting an "averaged signal" that may identify an audio signal that has been generated through performing averaging operations with respect to two or more microphone signals. Outputting an audio signal may refer to any audio signal that may be output by any single microphone or array of microphones. The output audio signal may be based on any number of different combinations of an individual microphone signal, a beamformed signal, and/or an averaged signal. Additionally, the term "audio signal" may include any type of signal that may include information that may represent sound or speech from user 106. The audio signals may be analog signals, digital signals, or a combination of analog and digital signals.

The audio signal may include data from sensors that indicate the shape, motion, and position of the mouth, throat, and face of user 106, face mask, or other physical parameters. Sensors may register sources of noise and generate noise-related signals that may be used in reducing the effects of noise in the audio signals. Signals from sensors may be combined with each other and/or with microphone signals and provided as input to speech recognition software. The sensors may include accelerometers, cameras, strain gauges, electromyographic (EMG) signals, position sensors, air motion detectors, and contact microphones. Accelerometers may detect motion (e.g., up and down) and/or vibration (e.g., skin vibration caused by speech) of the jaw and other parts of the face and may be attached to, in contact with, or in proximity to the skin. Cameras may register face mask and mouth movements such as mouth (including tongue, teeth, and lips) motion and shape and jaw motion. Mouth shape may include the distance between top and bottom lips, distance between points on the mouth such as the corners, position of the tongue and teeth, and other features that may change as speech is produced. Strain gauges may register stretching of parts of the skin or face mask. EMG signals may detect muscle activity, which may be associated with speech production. Position sensors may register the position of the face mask, jaw or other parts of the face. Air motion detectors may register are movement from breathing in or out, puffs of air from plosives such as the aspiration after a "p" sound, or air movement in and out of the nose. Contact microphones may extract speech signals from the face mask, throat, mouth, cheeks, other points on the skin.

In embodiments, where the audio signals output from the microphone are analog signals, an analog-to-digital converter (not shown) may be configured to receive and convert the audio signals into digital signals. In some embodiments, the analog-to-digital converter may be configured to individually receive each of several audio signals and to individually convert each of the audio signals into digital signals. Additionally, although the audio signals have gone through a change by the analog-to-digital converter, for the purposes of the present disclosure, the digital and/or analog signals may still be considered as being output by one or more of the microphones 110 in that they originally were derived from the microphones 110. In other words, the process step or operation of "outputting an audio signal" includes any conversion step by an analog-to-digital converter. Similarly, an "audio signal" or "output" is meant to include any conversion by analog-to-digital converter that may have occurred. The analog-to-digital converter may include any suitable system, apparatus, or device that may be configured to convert analog signals to digital signals.

The instructions in memory to perform operations may include operations to identify words contained in the output audio signal so that a corresponding transcription of the user's voice can be displayed on the display 112 of the facemask system 100. In one embodiment, the memory may include instructions to identify speech in an audio signal using speech recognition or automated speech recognition (ASR) technology known in the art. The term "speech recognition technology" as used in this disclosure includes both ASR and non-automated speech recognition and may include a compilation of hardware, software, and/or data, such as trained models, that are configured to identify or recognize speech in audio and generate a transcription of the audio based on the recognized speech. For example, in some embodiments, speech recognition technology may be a compilation of software and data models. In these and other embodiments, multiple ASR technologies may be included on a computer system, such as a server. Alternatively, or additionally, a speech recognition technology may be a compilation of hardware, software, and data models. In these and other embodiments, the speech recognition technology may include the computer system. In some embodiments, the transcription of the audio generated by the ASR technologies may include capitalization, punctuation, and non-speech sounds. The non-speech sounds may include, background noise, vocalizations such as laughter, filler words such as "um," and speaker identifiers such as "new speaker," "speech begin," and "speech end, "among others.

Speech recognition technology may be configured to operate in one or more locations. The locations may include the facemask system 100, the microphone 110, the display 112, an on- or off-board processor, another electronic computing device, or at an ASR service that is coupled to the facemask system 100 by way of a network (not shown). The ASR service may include a service that provides transcriptions of audio. Example ASR services include services provided by CaptionCall (registered trademark), Google (registered trademark), Microsoft (registered trademark), and IBM (registered trademark), among others. Accordingly, transcriptions of a user's voice using the facemask system 100 may be generated locally, or remotely.

In some embodiments, the speech recognition technology described in this disclosure may be a speaker-dependent ASR technology and/or a speaker-independent ASR technology. In some embodiments, a speaker-dependent ASR technology may use a speaker-dependent speech model. A speaker-dependent speech model may be specific to a particular person or a group of people. For example, a speaker-dependent ASR technology configured to transcribe the voice of a user may include a speaker-dependent speech model that may be specifically trained using speech patterns for the user, or a user environment. For example, the speech recognition technology may use speech patterns or the quality of speech from someone using a mask or someone that uses the facemask system 100 outside, or in a noisy environment. A speaker-independent speech model may be trained for general speech and not specifically trained using speech patterns of the people for which the speech model is employed.

In one embodiment, recognizing or identifying words or speech in the audio signal includes using acoustic models trained from voice samples. The acoustic models used in the speech recognition technology may be specially trained from voice samples from people wearing the facemask system 100. This allows the speech recognition technology to account for the noise or signal degradation associated with wearing a covering 102. Additional acoustic models can be trained from soft speakers or speakers in any number of environments. In one embodiment, the speech recognition training techniques that may be disclosed in U.S. Pat. Nos. 10,672,383, 10,573,312, and 10,388,272 (said technique disclosures being herein incorporated by reference) may be utilized by the facemask system embodiments described herein. In other embodiments, the identification and transcription of voice using speech recognition technology, including ASR accuracy, may be accomplished using the techniques and methods disclosed in U.S. Pat. Nos. 10,789,954, 10,504,519, 10,573,312, 10,580,410 and 10,325,597 (said technique and method disclosures being herein incorporated by reference) may be utilized by the facemask system embodiments described herein.

The speech recognition technology may be fully machine-based and may operate without human intervention and may be referred to in this disclosure as automatic. Alternatively, or additionally, the speech recognition technology may require human intervention. The term "ASR" is meant to encompass ASR that is not fully machine-based.

In some embodiments, the audio used by the speech recognition technology may be revoiced audio. Revoiced audio may include audio that has been received by the facemask system 100 and gone through a revoicing process. This may be the case where a third party service is used and the voice of the user is first heard by a third party who then revoices what was said into speech recognition technology, which then identifies and transcribes what was originally voiced. It will be appreciated that the functions of the identifying and transcribing words or speech may be performed by separate implementing structures.

Noise reduction or signal enhancement can be accomplished as part of one or more of the receiving, outputting, identifying, or other steps. Additionally, the noise reduction may be done as its own step and may be accomplish by a noise reducer or signal analyzer.

In one embodiment of the present disclosure using a directional microphone, noise reduction or signal enhancement may be accomplished by using a directional response configured with respect to a front of the directional microphone array. The response may be such that sound received at the rear of the directional microphone system may be attenuated with respect to sound received at the front. This may result in a higher signal-to-noise ratio (SNR) than omnidirectional microphones if the main signal of interest is arriving at the front of the directional microphone array and sounds arriving at locations other than the front are considered "noise." Directional microphone arrays may thus improve sound quality in the presence of background noise especially when the background noise is coming from behind the microphone in instances in which the directional response corresponds to the front of the directional microphone systems. However, the operations performed during the beamforming may be such that some types of noise, such as wind noise, that may be detected by the array of microphones may be disproportionately amplified and exacerbated such that the SNR of the beamformed signal may be reduced when noise is present.

Beamforming may also be used to reduce noise and enhance audio signals. For example, in some embodiments, it may be determined whether microphone signals that are generated by an array of omnidirectional microphones of the directional microphone system include noise. In response to determining that the microphone signals include noise, the directional microphone system may be configured to generate an output signal such that at least a portion of the output signal is not based on the beamformed signal.

Individual microphone signals that are generated by omnidirectional microphones typically may not be affected by noise as much as beamformed signals. As such, in some embodiments, the at least portion of the output signal may be based on only one of the microphone signals that may be generated by one of the omnidirectional microphones of the microphone array instead of being based on the beamformed signal. In these or other embodiments, the at least portion of the output signal may be based on an averaged signal that includes an average of two or more of the microphone signals that may be generated by two or more of the omnidirectional microphones of the microphone array instead of being based on the beamformed signal.

Additionally, or alternatively, in some embodiments, all of the output signals may be based on only one of the microphone signals or on the averaged signal. In these or other embodiments, the amount of the output signal that is not based on the beamformed signal may incrementally increase during the detection of the noise until none of the output signal is based on the beamformed signal. The incremental increase may be less noticeable by users to provide a better audio experience.

In these or other embodiments, in response to determining that the audio signals no longer include noise, the output signal may be generated such that at least a portion of the output signal that was previously based on only one microphone signal or on the averaged signal may instead be based on the beamformed signal. Additionally, or alternatively, the amount of the output signal that is based on the beamformed signal may incrementally increase after the noise ceases to be detected. In these or other embodiments, the incremental increase may be performed until all of the output audio signal is based on the beamformed signal after noise is no longer detected.

In other embodiments, the noise detection, reduction or cancellation techniques, the signal to noise ratio enhancement or improvement techniques, and the audio signal enhancement techniques that may be disclosed in U.S. Pat. Nos. 10,504,538 and 10,192,566 (said technique disclosures being herein incorporated by reference) may be utilized by the facemask system embodiments described herein.

It will be appreciated by those of skill in the art that other methods of reducing or cancelling noise may be employed to enhance an audio signal prior to identifying words or speech in the audio signal.

In one embodiment, operations include displaying the identified speech or words to one or more visual displays that may be integral with one or more of the covering 102, the microphone, the headset 118, the covering securement device 116, or any other component of the facemask system 100 that is on or about the face 104 or user 106. In other embodiments, displaying the identified speech or words to one or more visual displays includes displaying words or speech to one or more devices that are physically separate from the covering 102, the microphone, the headset 118, the covering securement device 116, or any other component of the facemask system 100 that is on or about the face 104 or user 106. In this embodiment, the display 112 may be configured to be in wireless communication with one or more of the covering 102, the microphone, the headset 118, the covering securement device 116, and any other component of the facemask system 100 that is on or about the face 104 or user 106. The physically separate visual display 112 may be the visual displays of desktop computers, laptop computers, smartphones, mobile phones, tablet computers, or any other computing devices that are in wireless communication with one or more components of the facemask system 100. The display 112 may be remote from the user 106 and may be separated from the user 106 by a network. For example, the display may be a video display used by a second party communicating with the user 106 via a video call and the text or other information extracted from user 106's microphones and sensors may appear over, above, below, or adjacent to a video image shown on the second party's screen.

In one embodiment, the operations display the text of the transcription to the one or more displays 112. In another embodiment, the operations may display the text of a translation of the transcription to one or more displays 112. In one embodiment, the translation may be into one or more foreign languages or other representations of language. By way of non-limiting example, the transcription might be translated into a universal representation such as morse code, semaphore, the International Code of Signals, and the like. In other embodiments, the transcription may be translated into sign language for any number of countries, including without limitation, American sign language (ASL).

Whereas sign language requires hand and arm movements and motions, the display may be configured to receive and display video signals. Accordingly, the operations may include displaying a video representation of arms and and/or hands signing the transcription. Displaying video representations of sign language may include comparing individual words or phrases within the transcription with a library of sign language representations and displaying the appropriate sign language video segment or segments with the corresponding transcribed word or phrase. The correlation between transcribed text and sign language may be improved over time by computer learning and artificial intelligence techniques know to those of skill in the art. It will be appreciated that similar operations may include converting translated transcriptions into the appropriate sign language.

In one embodiment, the transcription may be converted into and may include lip motion videos or representations of a mouth voicing the transcriptions. In this embodiment, those adept at lip reading may be better able to understand speech or voice that is difficult to be heard, regardless of whether the user's 106 mouth is visible.

In one embodiment, the translation and/or conversion may be part of the transcription process. In other embodiments, the translation and/or conversion may be part of a separate step or process than the transcription process. For purposes of this disclosure, it is to be understood that the term "transcription" is meant to include any prior translation and/or conversion that may have been performed on the transcription. Additionally, the terms "identified words" or "identified speech" is meant to include the transcription of any identified words or speech. Furthermore, the terms "words" and "speech" may be used interchangeably.

Accordingly, processes, devices, or operations to display "identified words" include processes, devices, or operations to display one or more of the text of a transcription, the text of a transcription translated into a foreign language, the text or representations of transcriptions converted into code or other systems or representations, the video of transcriptions converted into the sign language of one or more countries or systems, the video of translated or untranslated transcriptions converted into lip motion videos of a person mouthing the translated or untranslated transcription, the conversion of the translated or untranslated transcription into any other video or pictorial representation of the translated or untranslated transcription, and the like.

One or more displays may be configured to display one or more of text, pictorial, and video representations of a transcription or of the identified words. In certain embodiments, textual representations of transcriptions are presented, together with the sign language and/or lip motion representation of transcriptions, to one or more displays 112.

The speech recognition technology of the facemask system 100 may receive continuous audio and/or audio signals and may be configured to generate transcriptions in real-time or substantially real-time. Thus, the speech recognition technology may be configured to continuously work to generate a transcription. However, the generated transcription may not be synchronized with the audio in that for every period of time audio or audio signals are input to the speech recognition technology, the speech recognition technology outputs a corresponding transcription that corresponds to a period of time that has already occurred. The syncing and display techniques of continuous audio capture and transcription found in U.S. Pat. No. 10,504,519 (said technique disclosures being herein incorporated by reference) may be utilized by the facemask system embodiments described herein.

The memory in which instructions for performing operations to accomplish the functions, processes, and advantages of the embodiment disclosed herein may include non-transitory computer-readable media communicatively coupled to the processor 114.

Figure 2:
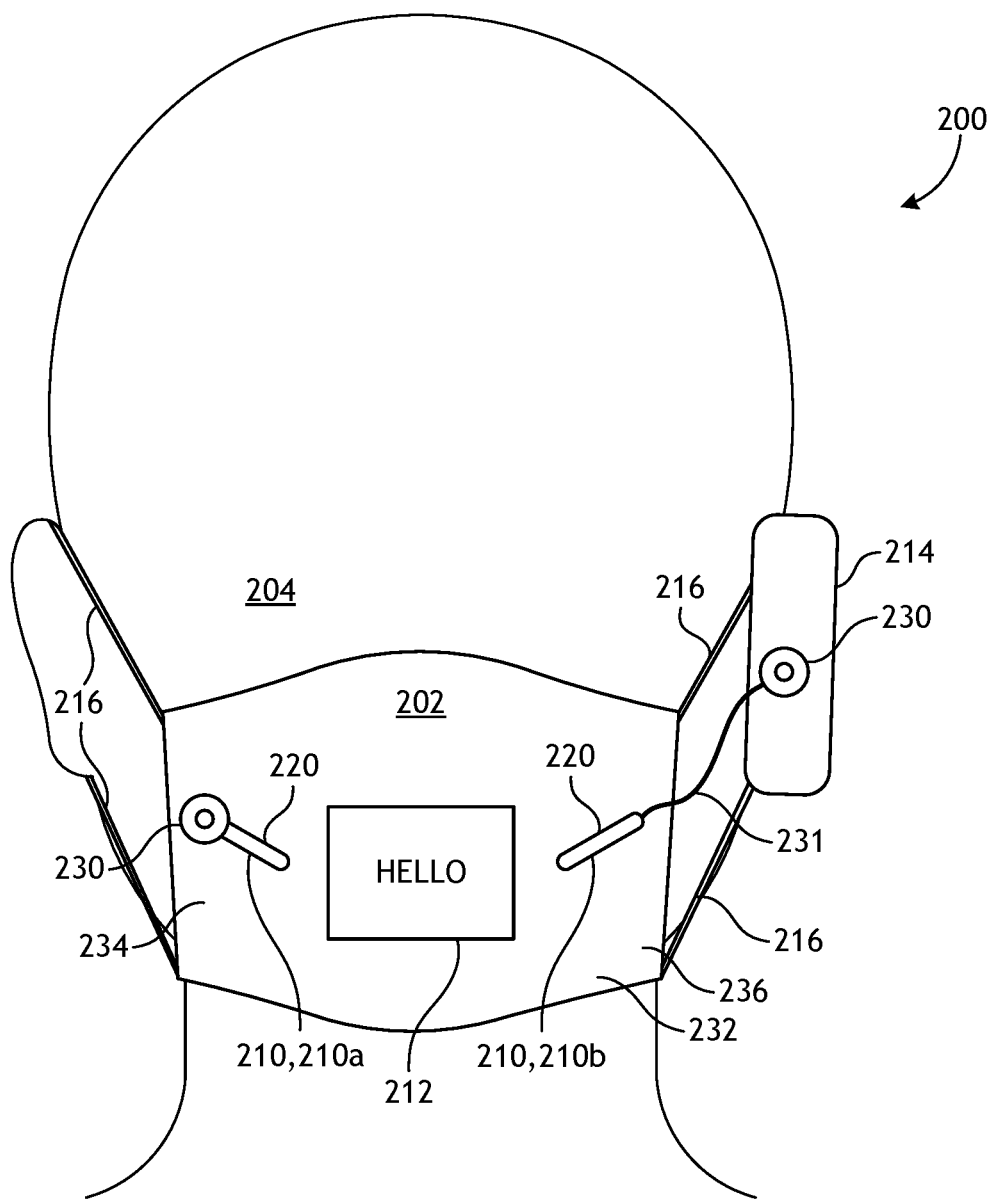
FIG. 2 is a front plan view of a characterization of a user using another embodiment of a facemask system disclosed herein.

Referring now to FIG. 2, an embodiment of the facemask system 200 is shown. The facemask system 200 includes a covering 202. A plurality of microphones 210 may be attached to the covering 202 such that at least some of the microphones 210 are adjacent a mouth (not shown) of a user 206. Each microphone 210 may be adjustably connected to one or more booms 220 that may also be connected to the covering 202. In one embodiment, the covering 202 may include a socket or receiver 230 configured to receive a plug or connector (not shown) of a microphone 210. The socket or receiver 230 may be any of a type known in the art to electronically connect to a microphone 210, either wired by means of an electronic wire 231, or wirelessly. It will be appreciated by those of skill in the art that one or more of the microphones 210, booms 220, sockets or receivers 230, plugs or connectors (not shown) may be attached or positioned on one or more of a covering's outer surface or layer 232, an inner surface or layer, and an intermediate layer (not shown), which may be positioned between the outer surface or layer 232 and the inner surface or layer.

In one embodiment, one or more of the plurality of microphones 210 may be a cardioid microphone. In another embodiment, one or more of the microphones 210 may be a directional cardioid microphone 210. The microphones 210 may be optimally positioned on the mask to maximize a signal-to-noise ratio (SNR) with respect to the user's voice. In one embodiment, a first microphone 210, 210a may be positioned adjacent a left side 234 of the covering 202 and a second microphone 210, 210b may be positioned adjacent a right side 236 of the covering 202. In one embodiment, the first microphone 210a may be positioned closer to the user's mouth (not shown) than the second microphone 210b. In this configuration, the first microphone 210a is a proximal microphone 210a and the second microphone 210b is a distal microphone 210b. In one embodiment, a proximal microphone 210a and a distal microphone 210b may be positioned on the same boom 220. The distal microphone 210b may be a cardioid microphone 210 configured to facilitate increasing an SNR by using a beam forming algorithm or other algorithm that uses a cardioid microphone 210 to increase SNRs. The microphones 210 may be configured and positioned to facilitate the triangulation of at least two microphone signals to increase an SNR or SNR output. Additionally, a plurality of microphones 210 may be configured to allow their output signals to be merged. It will be appreciated that SNR reduction may be accomplished using microphone ports strategically positioned on a single microphone. The term "microphone" may be used synonymously with the term "port" herein throughout.

In one embodiment, a display 212 may be attached to the user 206 in any number of ways. By way of non-limiting example, the display 212 may be small LED or LCD screen attached to a hat, broach, pin, name tag, clothing item or other item that the user may wear. The display 212 could be positioned on or about a user 206 such that the display faces outwardly, or in the direction of another person who could then see what is displayed on the display 212. In this configuration, the user 206 may not need to hold the display 212, such as when the display is a phone or tablet screen or attached to some other hand-held device. In another embodiment, the display 212 may be attached to, or integral with, one or more components of the facemask system 200. For example, the display 212 may be attached to the outer surface 232 of the covering 212.

The display 212 may also be integral with or integrated into the cover 202. In these embodiments, the display may include a textile-integrated LED display or LED-enabled fabric. In other embodiments, the display 212 may be a flexible screen that may be sown into the outer surface 232 of the covering 202. In one embodiment, the display 212 is positioned on the covering 202 such that the display does not unduly interfere with sound coming out from the mouth of the user or with microphones 210 tasked with picking up such sound. In certain embodiments, this may mean that the display 212 is positioned lower or higher than an area of the covering 212 immediately in front of the user's 206 mouth (not shown). Indeed, in certain embodiments, the facemask system 200 may include a plurality of displays 212 with one or more displays 212 being positioned on facemask system 200 components or hand-held devices. For example, one display 212 may be attached to a user's 206 hat and also hang down from a chain about the user's neck. The user may also have a handheld device that may display the same or different images that those displayed on other displays 212 of the facemask system 200.

The processor 214 may be attached to or integral with one or more components of the facemask system 200. In one embodiment, the processor is attached to a covering securement device 216. It will be appreciated by those of skill in the art that the processor 214 may be in operable connection and communication with one or more microphones 210, one or more displays 212 and other components, connectors, or connection devices, in any number of ways. Indeed, the connection and communication between the processor 214 and various components of the facemask system 200 may be wired or wireless. For example, some components may be in operable communication with the processor 214 via a Bluetooth connection. Other communications between facemask system 200 components and/or the processor 214 may be through a network. Memory (not shown) may be stored locally to the processor 214 or attached to other components of the facemask system 200. Some or all of the memory may be stored remotely, for example in the cloud or other networks, and may be in communication with the processor 214 in any number of ways know in the art.

The processor 214 may perform instructions stored in memory to perform the operations, instructions, functions, and processes described herein throughout. In certain embodiments, the operations performed by the processor 214 may include merging signals from two or more microphones. The operations may also include triangulating at least two microphone signals to increase the signal to noise ratio output from a user's voice input. The operations may include any number of triangulation algorithms to distinguish sounds from the user from other noises.

Figure 3:
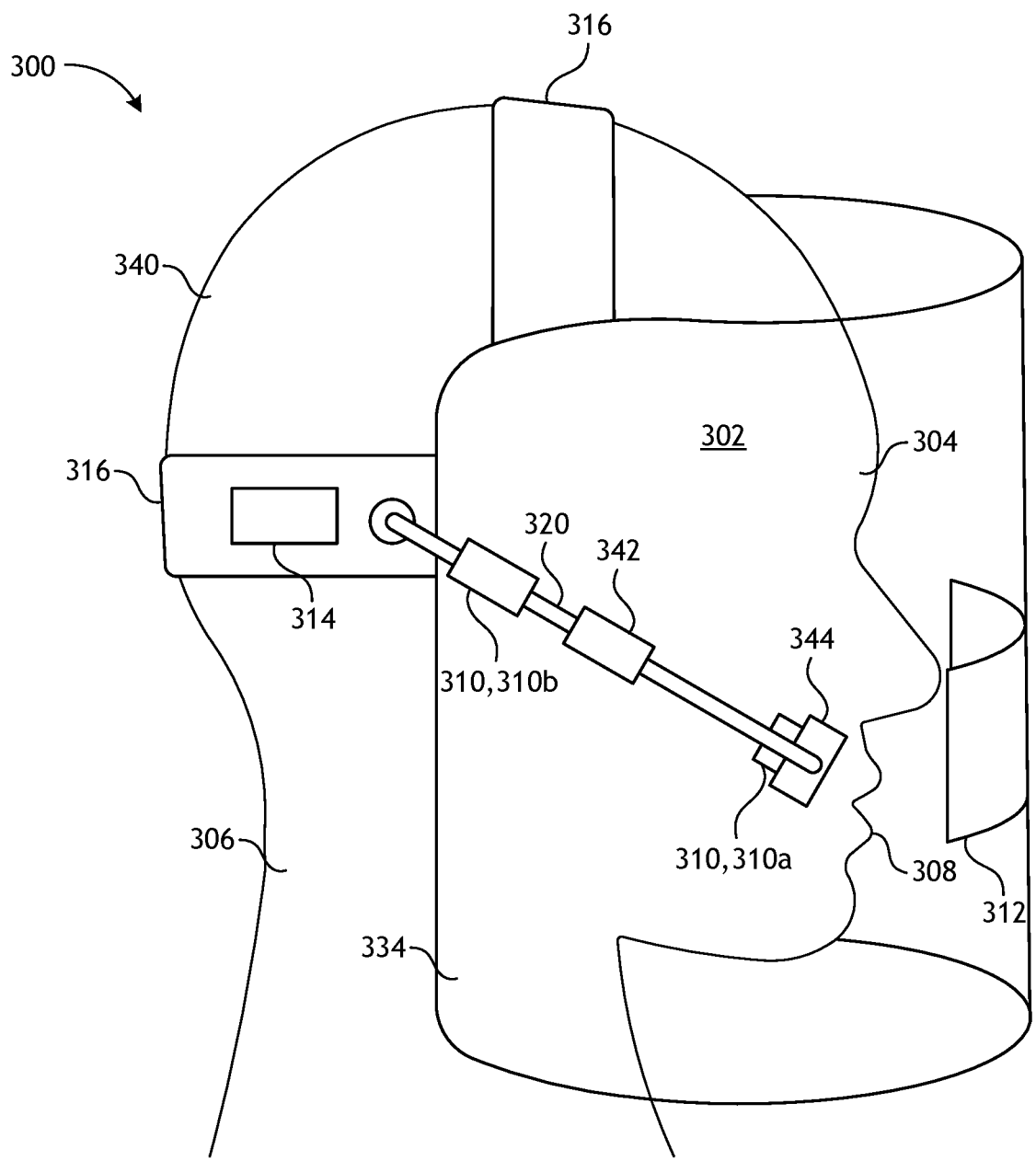
FIG. 3 is a side plan view of a characterization of a user using another embodiment of a facemask system disclosed herein.

Turning now to FIG. 3, a facemask system 300 is shown where the covering 302 is a flexible transparent material. In one embodiment, the covering 302 may be made out of Plexiglas, acrylic, polymer materials or other transparent material. A covering securement device 316 may include straps 316a that extend over and about a head 340 of a user 306 to position the covering 302 in front of the face 304 of the user 306. In one embodiment, the covering 302 and a display 312 are one and the same. Transcribed voice may be projected onto, or displayed within, the material of the covering 302. Where the display is by means of projection, the facemask system 300 may also include a projection device 342 in operable communication with the processor 314 by means discussed herein throughout. In one embodiment, the projection device 342 may be positioned on a boom 320. In other embodiments, the projection device 342 may attached to or integral with other components of the facemask system 300 such that text, video, or other information may be displayed on the covering 302 in a way that other people may view. It will be appreciated that the transcribed voice may need to be projected backwards from the user's side of the display in order for the information to appear normally to those viewing the display from the other side.

A first or proximal microphone 310, 310a may be positioned near the mouth 308 of the user 306. The proximal microphone 310, 310a may be attached to the boom 320, which may be attached to, or near, the left side 334 of the covering 302. The boom 320 and/or proximal microphone 310, 310a may be attached to facemask system components such as, by way of non-limiting example, the covering 302, the covering securement device 316, or other suitable components. In certain embodiments, components, or attachment points for components, such as for example, the boom 320 and/or microphones 310, may be positioned to the side of, above, and/or below the user's face 304 or head 340.

A second or distal microphone 310, 310b may be positioned further away from the mouth 308 or voice source than the proximal microphone 310, 310a. In the embodiment illustrated in FIG. 3, the distal microphone 310b is positioned on the boom 320. It will be appreciated however, that the proximal and distal microphones 310a and 310b may be attached to a plurality of booms 320 or need not be attached to a boom 320 at all. The microphones 310a and 310b may be attached to components of the facemask system 300 or positioned within the facemask system 300 in any of a number of ways know in the art. In certain embodiments, microphones 310 may be attached directly to the covering 302 or to the back (not shown) of the display 312.

As with other embodiments described herein, the microphones 310 may be optimally place for maximizing the signal-to-noise ratio with respect to the user's voice. For example, the positions of the proximal and distal microphones 310a and 310b can be used to triangulate where the user's mouth may be. Algorithms can be used in order to maximize the signal coming from the proximal microphone 310a and to minimize or reduce sound coming from other sound sources that are not from the user's mouth, such as a workplace environment or ambient noises. As with other embodiments, microphones 310, microphone 310 placements, and location or sound algorithms may be chosen to facilitate increasing the signal to noise ratio from the microphone closest to the user's mouth 308.

For example, in one embodiment, the distal microphone 310b may be a cardioid microphone and the processor 314 may perform operations to increase a signal to noise ratio of the desired sound input (a user's voice). In other embodiments, a facemask system 300 may be configured for a high-noise environment and may have directional microphones 310 located closer to the ear of a user than microphones 310 located closer to the user's mouth. In this configuration, the user's voice can be mathematically located to cancel other noises and maximize SNR. It will be appreciated by those of skill in the art that a variety of microphone topologies may be utilized to enhance the sound signal of a user's voice. In one embodiment, beamforming techniques may be employed in conjunction with a circular or other formation or positioning of the microphones, or ports within a one or more microphones, to enhance a voice signal.

In yet another embodiment, differential microphone 310 topology may be used to achieve directionality. In this embodiment, a single microphone may have at least two ports (not shown) through which sound enters. A front or proximal point may be oriented toward the desired sound (the user's voice) and another or proximal port may be more distant from the desired sound. The microphone 310 may include a diaphragm (not shown) placed between the two ports. Sound arriving from an ambient sound field reaches both ports at substantially the same time. The sound entering the port that is closer to the desired sound will create a greater pressure gradient between the front and back of the diaphragm. This proximity affect causes the diaphragm to move. The diaphragm movement may be measured and used to adjust the microphone's proximity affect so that the movement of the diaphragm has a flatter frequency or sound sources very close to the front of the microphone 310. The microphone 310 position or positions may be adjusted to detect sounds from angles that are likely not from the user's mouth. In this way, unwanted noise may be minimized.

In another embodiment, the facemask system 300 may have a plurality of microphones 310. The microphones 310 may be coupled with active of passive circuitry to reduce undesired noise and focus on a user's voice. In this embodiment, the proximal microphone 310, 310a is positioned to detect the user's voice and the distal microphone 310, 310b is positioned to receive ambient noise. In a noisy environment, the proximal and distal microphones 310a and 310b may receive noise at s similar level, but the proximal microphone 310a receives the desired sounds at a stronger signal strength or intensity. My subtracting one signal from the other, for example by connecting the microphones 310 out of phase, much of the undesired noise may be cancelled while the user's voice is retained. It will be appreciated by those of skill in the art that using a directional microphone 310 as the proximal microphone 310a may make the cancellation of undesired noise easier to accomplish. Additionally, or alternatively, a microphone may be positioned to preferentially pick up sound from the nose. The nose signal may be provided as an independent input to noise cancellation and/or speech recognition software.

In yet another embodiment, the facemask system 300 may include internal electronic circuitry or software and the processor may use other types of passive or active noise canceling techniques known in the art to filter out the noise. In this way, the facemask system 300 may produce an output signal that has a lower noise floor and a higher signal-to-noise ratio.

Although the embodiment of FIG. 3 shows the left side of a user. It will be understood by those skilled in the art that microphones, booms, and/or other supporting structures or components may be similarly configured and positioned adjacent a right side (not shown) of a user's face 304. Indeed, facemask components may be configured and positioned in a variety of positions about a user's mouth 308 and face 306 in order to have the processor 314 employ voice signal enhancing techniques and/or reduce the signal of undesired noise.

Figure 4:
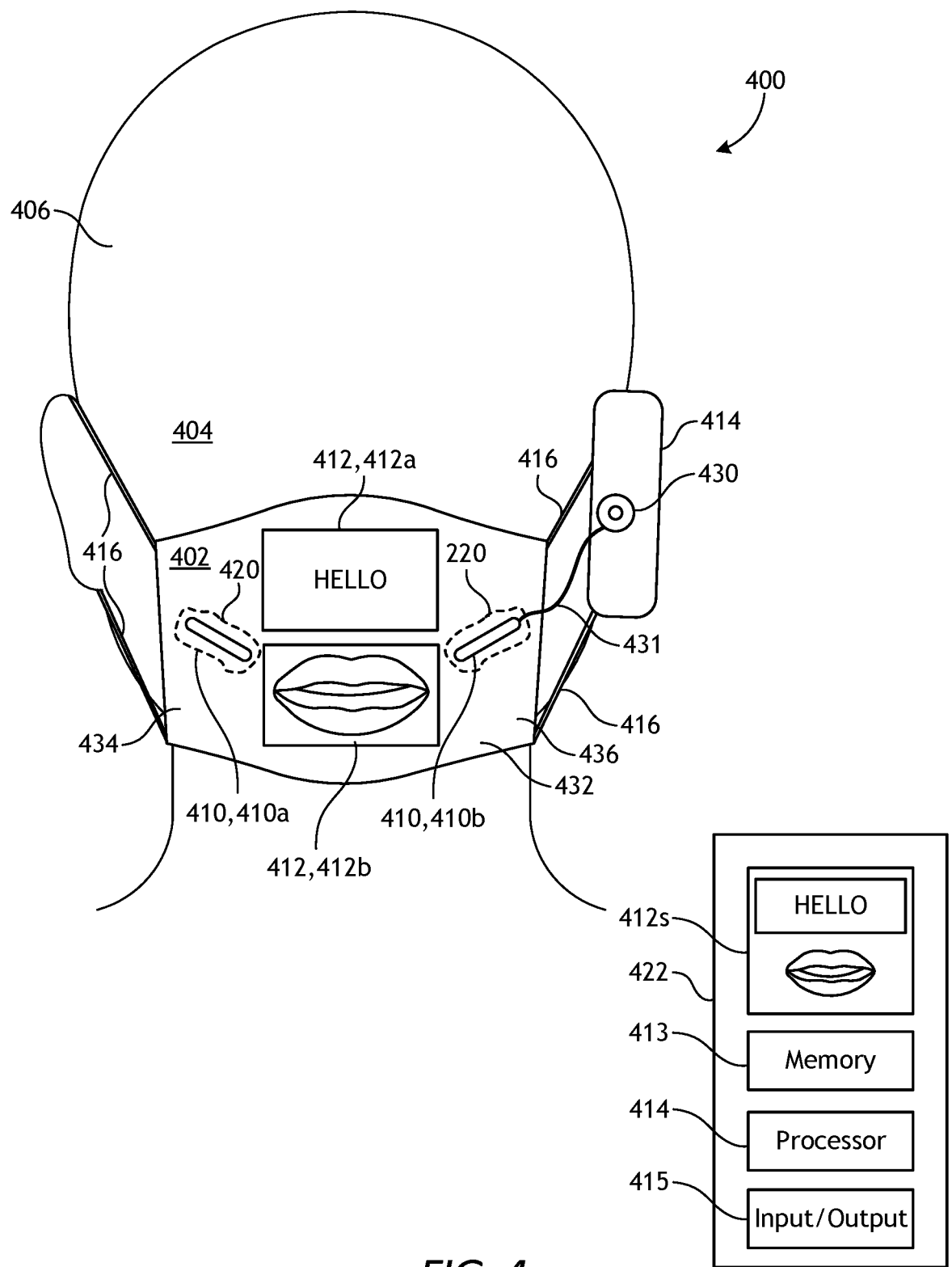
FIG. 4 is a front plan view of a characterization of a user using another embodiment of a facemask system disclosed herein.

Turning now to FIG. 4, an embodiment the facemask system 400 is shown where a display 412 is configured to display both text and video content. The text and video content may be shown on separate displays 412a, 412b or may be shown on different areas of the same display 412. Video content may be desirable when the user is talking to someone who may benefit from a display other than text. For example, someone with a reading disability or who may not be able to read small text may be able to understand what is being said by seeing video images. The deaf or hard-of-hearing community may benefit from having a user's voice displayed as sign language, which most often requires motion that is more readily displayed by video output. Additionally, the video may display an avatar or a mouth speaking the words that the user is speaking, which may help those who typically communicate by reading lips. These and other helpful video displays may be used alone, or in conjunction with each other and/or text displays.

Accordingly, instructions stored in memory, that when executed by a processor, perform operations, may include instructions to receive audio, identify words or speech in audio signals associated with the audio, and then display a video representation of the transcription or a translation of the transcription. In one embodiment, the video representation may be sign language motions. The operations to display video representation may include determining particular moving lip video clips that correspond to the recognized or identified speech or transcription and displaying those clips on one or more displays 412.

In one embodiment, the speech recognition, translation into sign or other languages, and/or correspondence between speech and lip video clips may be accomplished by reference to a library not shown. The system 400 may have an input function for receiving input on the correctness of the speech recognition as compared to the actual words or speech spoken by a user. The facemask system 400 may also have an input function for receiving input on the correctness of the translation, sign language, or lip movement as compared to identified words or speech. The facemask system 400 may use artificial intelligence techniques to update and improve the quality and accuracy of its speech recognition and translation. The input techniques may be any of a number of input devices and may be a function of an app or program that the user or manufacturer may use to interact with the facemask system 400. Alternatively, or additionally, the audio may be provided to a listener. The listener may hear user 106's voice via a speaker.

In one embodiment, the facemask system 400 may include a computer system 422. The computer system 422 may include a display 412s, memory 413, a processor 414, and input/output devices 415. The computer system 422 its components may be in operable communication with some or all of the components of the facemask system 400 and may be utilized to perform the audio capture and display of audio signal transcription. The computer system 422 may also be used to train the system to recognize types and qualities of various voices or audio in various circumstances and environments. A voice or audio model may use the input/output 415 to record various audio for use by the facemask system 400. The computer system 422 may also be used to improve computer learning or AI recognition and display of speech text or video and create. For example, in one embodiment, the transcribed voice audio signal that is shown on a display 412 adjacent or near the microphone 410 may also be simultaneously displayed on the display 412s of the computer system 422. A quality control person or system may be able to use the computer system 422 to correct transcription errors, text display errors, or video display errors to help the system learn to better identify words and correlate them to textual or visual representations.

Figure 5:
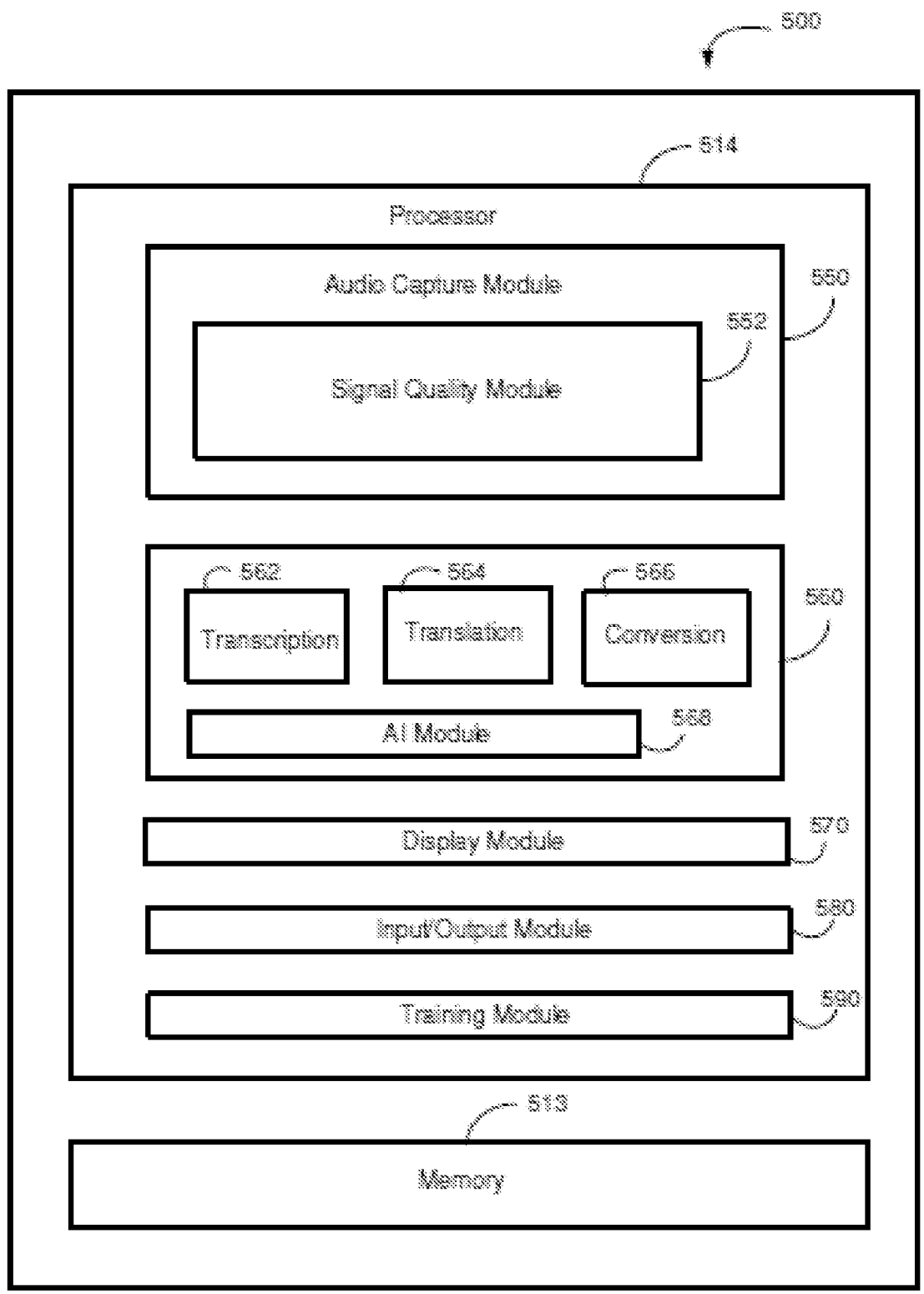
FIG. 5 is a schematic block diagram of an embodiment of the facemask system disclosed herein.

Referring now to FIG. 5, a block diagram of a facemask system 500 is shown. The facemask system 500 may include memory 513 and a processor 514. The processor 514 may include modules for performing operations to accomplish the functions, features, processes, methods and/or tasks of a facemask system 500. The operations may be in the form of instructions stored in memory 513 and may be performed by or more implementing structures. In one embodiment, the processor includes an audio capture module 550 for receiving audio and outputting audio signals from at least one microphone. The audio capture module 550 may include signal quality module 552 for determining which audio signals are most likely voice signals. This module 552 apply noise cancelling techniques, beamforming algorithms, triangulation, signal differentiation, signal merging, signal isolation techniques, other mathematical algorithms, and the like in order to increase the signal to noise ratio of the voice signal or otherwise determine or enhance the voice signal. The signal quality module 552 may output an enhanced audio signal.

The processor 514 may include a speech module 560 for identifying words and speech within the enhanced received audio signals. The speech module 560 may include a transcription module 562 for identifying or recognizing words or speech in an audio signal or enhanced audio signal. The speech module 560 may include a translation module 564 for translating the recognized speech into at least one predetermined language, including sign language. The translation module 564 may include a conversion module 566 for correlating the transcription and/or translated transcription with sign language video clips and/or lip movement video clips. The speech module 560 may include an AI module 568 for learning and increasing the accuracy of the audio signal transcription, the transcription or audio signal translation, and/or the transcription and/or translated transcription conversion into one or more forms of image or video representations.

The processor 514 may include a display module 570 for displaying text and/or video content to one or more displays. The processor 514 may also have an input/output (TO) module 580 to control inputs and outputs of the facemask system 500. In one embodiment, the processor 514 may have a training module 590 for tuning or training acoustic models or providing a library of sounds, phonemes, sign language motions, lip motions, and the like. The training module 590 may work in conjunction with the AI module 568 and other modules. Indeed, the various modules may work together with other modules and may have overlapping functionalities. For example, the training module 590 may work in conjunction with the input/output module 580 to record various voice samples or acoustic modules such as, by way of nonlimiting example soft speakers, speakers through different materials, speakers in different environments, speakers having different accents, and the like. These inputs can then be used by the speech module to help identify words or speech in an audio signal. It will be appreciated by those of skill in the art the modules may be organized in a number of ways and the operations of one module may overlap the operation of another module. The processor 514 and memory 513 are configured to perform the processes, methods, and functionalities disclosed herein throughout.

Figure 6:
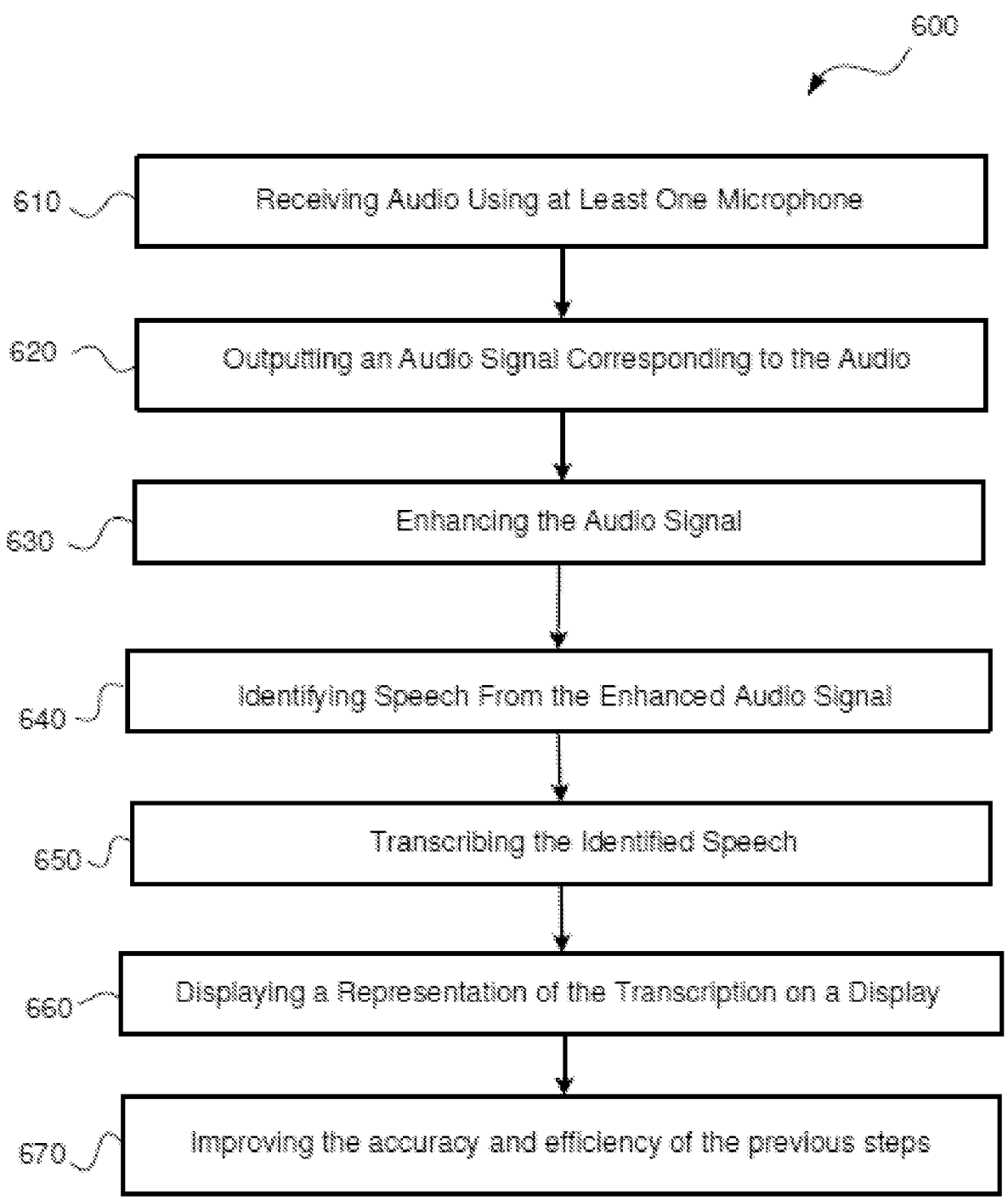
FIG. 6 is a schematic block diagram of an embodiment of method of displaying transcribed voice according to embodiments disclosed herein.

Turning now to FIG. 6, a method 600 of displaying text or video corresponding to the voice of a user wearing a mask is shown. In one method step, audio may be received or captured 610 by one or more microphones. In a subsequent step, the received or captured audio may be output 620 as audio signals. The audio signals may be enhanced 630 to facilitate transcription of the audio signal into speech. The enhancing step 630 may include analyzing the audio signal to determine which of the audio signals are voice signals. In other embodiments, the method 630 may include analyzing the audio signals to isolate the voice signal and/or reduce noise or audio signals determined to originate from a source other than a user's voice. The method 600 may include the step of using the enhanced audio signal of the previous step to identify 640 speech within the audio or enhanced audio signals. This step 640 may be performed using speech recognition techniques, including automated speech recognition. The method 600 may include the step of transcribing 650 the identified speech. This step 650 may include translating recognized speech into a different language, including sign language. The step 650 may also include correlating identified speech with lip motion video clips. It will be appreciated by those of skill in the art that the translation and/or conversion step may be performed simultaneously with, or as part of, the identifying step 640 and/or the transcribing step 650. The method may include the step of displaying 660 the recognized and/or translated speech to one or more displays. In one embodiment, the method may include a learning step 670 for receiving user or operator inputs or corrections to certain voice recognition, or certain voice to text or video correlations. This step can be used to improve the accuracy and efficiency of the previous steps.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

The scope of the present invention is defined by the appended claims.

What is claimed is:

1. A facemask system, comprising:
a covering configured to cover at least a portion of a face of a user when the covering is worn;
a plurality of microphones attached to the covering, wherein the plurality of microphones comprises a first microphone and a second microphone;
a display attached to the covering;
a processor in operable communication with the plurality of microphones and the display; and
memory containing instructions that can be executed by the processor to perform operations, the operations comprising:
receiving audio from the plurality of microphones;
outputting, based on the received audio, an audio signal that comprises a non-beamformed signal associated with the first microphone and a beamformed signal associated with the second microphone;
identifying, based on the audio signal, words contained within the audio signal; and
displaying the identified words on the display.

2. The facemask system of claim 1, wherein the covering comprises LED-enabled fabric.

3. The facemask system of claim 1, wherein the covering comprises a moisture barrier.

4. The facemask system of claim 1, wherein the first microphone is attached to a left side of the covering and the second microphone is attached to a right side of the covering.

5. The facemask system of claim 1, wherein at least one of the plurality of microphones is a directional cardioid microphone.

6. The facemask system of claim 1, wherein at least one of the plurality of microphones comprises a sensitivity lower than 15 mV (−36 dB V/Pa).

7. The facemask system of claim 6, wherein the sensitivity is higher than 0.5 mV (−66 dB V)/Pa).

8. The facemask system of claim 1, wherein the first microphone is a proximal microphone and the second microphone is a distal microphone, and the proximal microphone is positioned closer to a user's mouth than the distal microphone, and wherein signals from the proximal microphone and the distal microphone are used to increase a signal-to-noise ratio output.

9. The facemask system of claim 1, further comprising a shield attached to the plurality of microphones, the shield configured to reduce undesired noise signals.

10. The facemask system of claim 1, wherein the operations further comprise using automated speech recognition software.

11. The facemask system of claim 1, wherein the operations further comprise displaying one or more of text and video signals.

12. The facemask system of claim 11, wherein the operations further comprise displaying the identified words as one or more of sign language motion and lip movement.

13. The facemask system of claim 11, wherein the operations further comprise displaying the identified words in a different language than what was spoken.

14. The facemask system of claim 1, wherein the operations further comprise triangulating signals from the first microphone and the second microphone to increase a signal to noise ratio output of the first microphone.

15. The facemask system of claim 1, wherein the second microphone is a cardioid microphone and wherein the operations further comprise increasing a signal to noise ratio based on the beamformed signal from the second microphone.

16. The facemask of system claim 1, wherein identifying words contained within the voice signals further comprises using acoustic models trained from voice samples from people wearing the facemask system.

17. A facemask system, comprising:
a covering configured to cover at least a portion of a face of a user when the covering is worn;
a plurality of microphones attached to the covering, wherein the plurality of microphones comprises a first microphone attached to a left side of the covering and a second microphone attached to a right side of the covering, and at least one of the first microphone or the second microphone is a directional cardioid microphone;
a display attached to the covering;
a processor, the processor in operable communication with the plurality of microphones and the display; and
memory containing instructions that can be executed by the processor to perform operations, the operations comprising:
receiving audio from the plurality of microphones;
outputting, based on the received audio, an audio signal that comprises a non-beamformed signal associated with the first microphone and a beamformed signal associated with the second microphone;
reducing, based on the audio signal, noise in the audio signal; and
identifying words contained within the audio signal received from the plurality of microphones using automated speech recognition software; and
displaying the identified words on the display as one or more of text and video signals.

18. The facemask system of claim 17, wherein the covering comprises LED-enabled fabric.

19. The facemask system of claim 17, wherein the covering comprises a moisture barrier.

20. The facemask system of claim 17, wherein at least one of the plurality of microphones comprises a sensitivity ranging from about 8.0 mV (−42 dBV/Pa) to about 1.0 mV (−60 dBV)/Pa).

21. The facemask system of claim 17, wherein the first microphone is a proximal microphone and the second microphone is a distal microphone, and the proximal microphone is positioned closer to a user's mouth than the distal microphone, and wherein signals from the proximal microphone and the distal microphone are used to increase a signal-to-noise ratio output.

22. A facemask system, comprising:
a covering configured to cover at least a portion of a face of a user;
a plurality of microphones attached to the covering, wherein the plurality of microphones comprises a first microphone and a second microphone, and at least one of the plurality of microphones is a directional cardioid microphone and wherein at least one of the plurality of microphones comprises a sensitivity ranging from about 8.0 mV (−42 dB V/Pa) to about 1.0 mV (−60 dBV)/Pa;
a display attached to the covering;

a processor in operable communication with the plurality of microphones and the display; and memory containing instructions that can be executed by the processor to perform operations, the operations comprising:

receiving signals from the first microphone and the second microphone, wherein the signals comprises a non-beamformed signal associated with the first microphone and a beamformed signal associated with the second microphone;

reducing, based on the non-beamformed signal and the beamformed signal, noise of the signals using noise cancelling techniques;

identifying words contained within the signals using automated speech recognition software; and displaying the identified words on the display as one or more of text, sign language, and lip movements.

\* \* \* \* \*